US009019561B1

(12) United States Patent
Sanchez et al.

(10) Patent No.: US 9,019,561 B1
(45) Date of Patent: Apr. 28, 2015

(54) PROFILING DATA SPACING FOR DIFFERENT HALFTONE STATES USING A SINGLE TONE REPRODUCTION CURVE

(71) Applicant: Xerox Corporation, Norwalk, CT (US)

(72) Inventors: James M. Sanchez, Rochester, NY (US); Guo-Yau Lin, Woodlands, TX (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/299,865

(22) Filed: Jun. 9, 2014

(51) Int. Cl.
*H04N 1/60* (2006.01)
*G06K 15/02* (2006.01)

(52) U.S. Cl.
CPC .......... *G06K 15/027* (2013.01); *G06K 15/1881* (2013.01)

(58) Field of Classification Search
None
See application file for complete search history.

(56) References Cited

U.S. PATENT DOCUMENTS

| | | | | |
|---|---|---|---|---|
| 6,484,631 | B2 * | 11/2002 | Degani et al. | 101/171 |
| 6,906,828 | B2 * | 6/2005 | VanDuyn et al. | 358/2.1 |
| 6,967,742 | B1 * | 11/2005 | Nagashima | 358/1.9 |
| 7,092,119 | B1 * | 8/2006 | Hinds et al. | 358/1.9 |
| 7,207,645 | B2 * | 4/2007 | Busch et al. | 347/19 |
| 7,539,428 | B2 * | 5/2009 | Yamada | 399/49 |
| 8,045,189 | B2 * | 10/2011 | Kurakata | 358/1.13 |
| 8,253,975 | B2 | 8/2012 | Bai | |
| 8,345,311 | B2 | 1/2013 | Fischer et al. | |
| 8,368,955 | B2 | 2/2013 | Wu | |
| 8,422,077 | B2 * | 4/2013 | Jung | 358/1.9 |
| 8,564,834 | B2 | 10/2013 | Lin et al. | |
| 8,610,932 | B2 | 12/2013 | Niles et al. | |
| 8,743,421 | B1 * | 6/2014 | Ross et al. | 358/1.9 |
| 2004/0136016 | A1 * | 7/2004 | Oshikawa et al. | 358/1.9 |
| 2006/0193017 | A1 * | 8/2006 | Zuber | 358/504 |
| 2008/0165379 | A1 * | 7/2008 | Zuber | 358/1.9 |
| 2009/0034006 | A1 | 2/2009 | Blondal et al. | |
| 2010/0149567 | A1 * | 6/2010 | Kanazawa et al. | 358/1.9 |
| 2013/0011153 | A1 * | 1/2013 | Toriyabe | 399/49 |

* cited by examiner

*Primary Examiner* — Dung Tran
(74) *Attorney, Agent, or Firm* — Gibb & Riley, LLC

(57) ABSTRACT

Methods and devices calibrate a printing device to develop a single calibration tone reproduction curve associated with a first halftone state for the printing device, and calculate a primary color profile for the first halftone state and secondary color profiles for the secondary halftone states available with the printing device based on a previously calculated relationship between the first halftone state and the secondary halftone states. Subsequently, these methods and devices receive a print job and such methods identify the secondary halftone state of the print job. With this, the methods and devices can identify a secondary color profile from the secondary color profiles that corresponds to the secondary halftone state and raster image process the print job using the secondary color profile to produce rasterized output. Then, these methods and devices print the rasterized output on print media using a print engine of the printing device.

20 Claims, 4 Drawing Sheets

PROFILING DATA SPACING FOR DIFFERENT HALFTONE STATES USING A SINGLE TONE REPRODUCTION CURVE

BACKGROUND

Systems and methods herein generally relate to printing systems and more particularly systems that calibrate tone reproduction curves for different halftones.

As the number of color printers in common use has increased over the past decade, end users of such devices have become aware of the need to recalibrate these devices. Because of the nature of color reproduction, color printers are more subject to drift than are their black and white counterparts. One cause of such drift is deviation of the underlying components due to age or changes in the environment. For example, a typical color printing device is likely to vary due to changes in the underlying marking process in response to external conditions like temperature and humidity, and internal changes due to aging of the components. These variations from a known, standard state can result in undesirable variation in the appearance of the output from such reprographic devices. This may introduce various artifacts in the copy of the document produced by the output printer. For example, one or more portions of the copy may be too dark, too light, be shaded inaccurately, or include other artifacts. Compounding this problem of drift is the sensitivity of human perception, which, for certain colors, emphasizes even minor shifts or differences in color.

Common calibration methods include printing a test target and scanning it with a scanner that forms a part of the color reproduction device. The device compares the desired values with the values obtained from scanning the printed test target to calibrate the processing of image data to compensate for differences between the desired values and the values obtained from scanning the printed test target.

Printing systems targeted for non-graphic arts, low cost, and simple print production commonly offer multiple halftone states, where each halftone has a different, non-linear, "raw" or "native" response. The large development cost associated with developing a raster image processor (RIP) digital front end (DFE) that enables automated halftone tone reproduction curve (TRC)/profile matching make such RIP DFE's not cost effective for low cost systems.

SUMMARY

Exemplary methods herein calculate a relationship between a nominal halftone (e.g., a first halftone state) and non-nominal halftones (e.g., secondary halftone states that are different from the primary halftone state) based on printing capabilities of a printing device using a processor of the printing device to allow a single tone reproduction curve calibration to be used for all halftones. The relationship between the first halftone state and the secondary halftone states is a relationship based on ideal printing characteristics for the printing device that would be produced by a defect-free printing device that had not yet experienced wear.

Specifically, such methods calibrate the printing device to develop a single calibration tone reproduction curve associated with the first halftone state for the printing device, using the processor. This single calibration allows these methods to calculate a primary color profile (e.g., nominal profile) for the first halftone state, as well as secondary color profiles (e.g., non-nominal profiles) for the secondary halftone states available with the printing device based on the previously calculated relationship between the first halftone state and the secondary halftone states using a processor of the printing device. The primary and secondary color profiles control how the printing engine prints colors of the print job.

Subsequently, these methods receive (into the printing device) a print job to be printed using the printing device, and such methods identify the secondary halftone state of the print job (using the processor). With this, the methods can identify a secondary color profile from the secondary color profiles that corresponds to the secondary halftone state and raster image process the print job using the secondary color profile to produce rasterized output (using the processor). Then these methods print the rasterized output on print media using a print engine of the printing device.

Printing devices herein include, among other components, a processor, an input/output interface, a printing engine, a scanner, etc. The processor calculates a relationship between a first halftone state and secondary halftone states based on printing capabilities of a printing device. The processor also calibrates the printing device using the printing engine and scanner to develop a single calibration tone reproduction curve associated with the first halftone state for the printing device. The processor then calculates a primary color profile for the first halftone state and secondary color profiles for the secondary halftone states available with the printing device based on the calculated relationship between the first halftone state and the secondary halftone states.

Subsequently, the interface receives a print job to be printed using the printing device and the processor identifies a secondary halftone state of the print job. The processor also identifies a secondary color profile from the secondary color profiles that corresponds to the secondary halftone state. The processor then raster image processes the print job using the secondary color profile to produce rasterized output, which is then printed on print media using the printing engine.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, the large development cost associated with developing a raster image processor (RIP) digital front end (DFE) that enables automated halftone tone reproduction curve (TRC)/profile matching make such RIP DFE's not cost effective for low cost systems. Therefore, the systems herein provide methods for linearized response states, in multiple, non-linear, native printer halftone response systems, using a single calibration TRC RIP workflow. Thus, the methods herein effectively compensate/linearize different non-linear states in simple, single RIP TRC, workflow systems.

Where a single TRC is present for RIP, the data acquisition process for profiling (which depends on the appropriate method of linearization to properly space cyan, magenta, yellow, black (CMYK) patch outcomes to effectively sample the gamut), standard methods of using multiple TRC in place are not cost effective. The methods and systems herein address this and provide proper profiling data spacing for each halftone via separate TRC, and the provide the ability to do so and still meet simplicity and cost requirements. Thus, these methods properly space CMYK values for data acquisition and provide for data spacing during raster image processing that matches that during profiling (all in a one TRC RIP workflow).

In the case where simple printer operation excludes the laborious generation of specific calibration TRC's for each halftone (and extensive software development in database tracking of all halftone specific TRC's coupled with halftone specific profiles), the use of a single TRC, updated locally as needed, is appropriate. While these simple, low cost requirements drive the product to use one calibration TRC, good image quality still remains relevant, and requires proper adaptation of profiling to the state of the machine, for each halftone state.

Therefore, the methods and systems herein provide a multi-step process to encode approximate knowledge of those halftone states that are significantly different from nominal and that require very different TRC's. A "nominal" halftone state is the halftone state that corresponds with the single TRC that low-end printing devices utilize. Halftone states that are different from the nominal states are sometimes referred to herein as being "non-nominal" because they do not correspond to the single TRC that is used with low-end printing devices.

Figure 1:
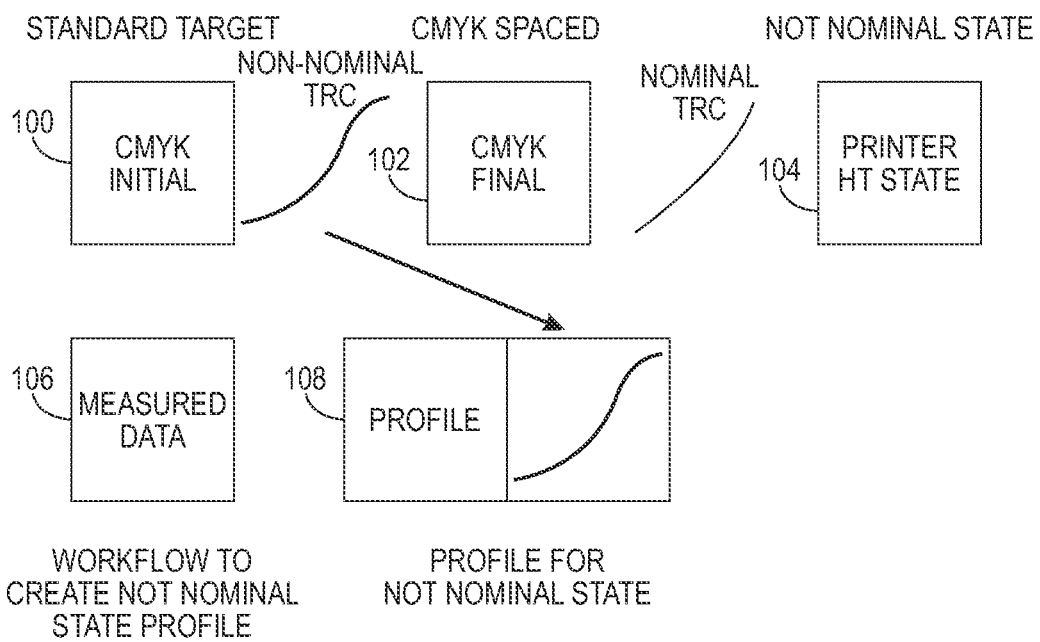
FIG. 1 is a schematic diagram illustrating functions of methods and devices herein.

Specifically, as shown in FIG. 1, these methods encode (in the profiling target 100) a CMYK separation method 102 that captures the effect of a TRC with mated curvature for the non-nominal halftone states 104. More specifically, with respect to item 102, these methods calibrate the printing device to develop a single calibration tone reproduction curve associated with the nominal halftone state for the printing device. The calibration process uses a test sheet printed by the print engine and scanned by a scanner of the printing device. This single calibration allows these methods to calculate a nominal color profile for the nominal halftone state, as well as non-nominal color profiles for the non-nominal halftone states available with the printing device based on a previously calculated relationship between the nominal halftone state and the non-nominal halftone states. Then, such methods print a target page 104 using a printing system that uses the single nominal calibration TRC. After this, these methods generate a profile 108 from the profiling target. These methods then encode (in the output node set of created ICC profile generated) the effect of a TRC with mated curvature for the non-nominal case (a TRC on the output nodes 106).

Figure 2:
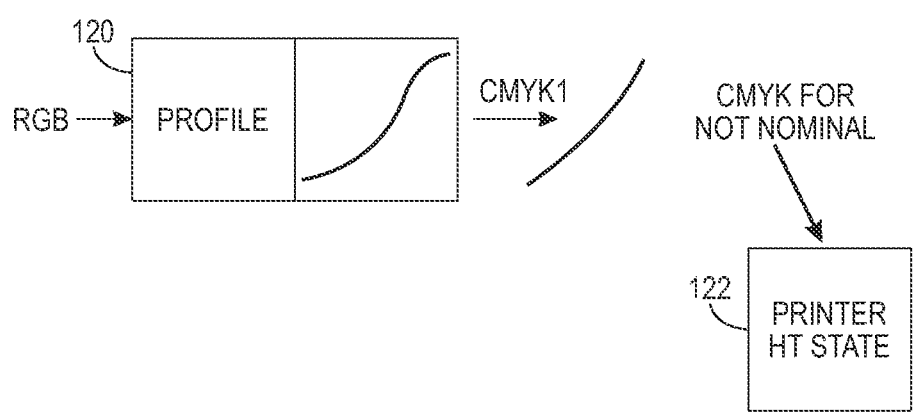
FIG. 2 is a schematic diagram illustrating functions of methods and devices herein.

Thus, as shown in FIG. 2 once the non-nominal profile 120 is derived for use on a non-nominal state with a nominal TRC, then (at RIP) the non-nominal profile is put in place for data, the nominal TRC is put in place, CMYK output data is created for the non-nominal printer state, which allows printing 122 to proceed. Therefore, these methods and systems provide a static, non-nominal TRC with enough curvature to compensate for non-nominal halftone state at profile build time, and, incorporate the same in profile output nodes. At RIP, the non-nominal profile is used in conjunction with the nominal TRC to effect meeting all image quality requirements for nominal and all non-nominal halftone printer states.

Figure 3:
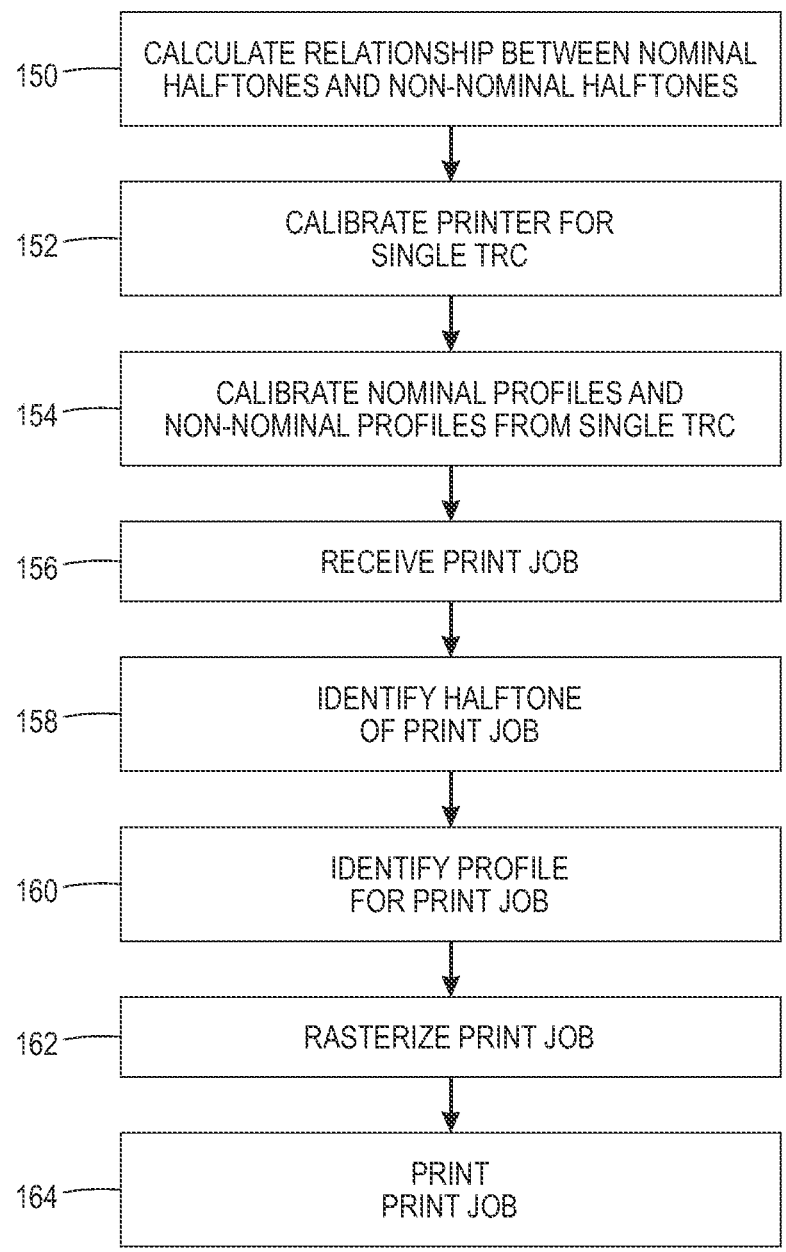
FIG. 3 is a flow diagram of various methods herein.

FIG. 3 is flowchart illustrating exemplary methods herein. In item 150, these methods calculate a relationship between a nominal halftone (e.g., a first halftone state) and non-nominal halftones (e.g., secondary halftone states that are different from the primary halftone state) based on printing capabilities of a printing device using a processor of the printing device to allow a single tone reproduction curve calibration to be used for all halftones. The relationship between the first halftone state and the secondary halftone states is a relationship based on ideal printing characteristics for the printing device that would be produced by a defect-free printing device that had not yet experienced wear. Given the same materials, but over a lapse of time, the user may experience inconsistency in rendered colors color management, and adjustments may be necessary.

Two useful adjustments to color management in regard to digital printers are printer calibration and color profiles stored on the printers. Calibration is the process by which colors that are produced by a particular printer are adjusted according to particular references of colors for that particular printer. For example, it has been found that the printed colors from a particular printer drift over time. Thus, calibration is a process that compensates for printer drift over time in order to reach a known color reference. For example, after a particular period of time, one skilled in the art knows to calibrate the printer so that the expected color output is again achieved. As another example, consumers of printer cartridges for home printers know to calibrate the printer after they have just installed a new ink cartridge.

Therefore, in item 152, these methods calibrate the printing device to develop a single calibration tone reproduction curve associated with the first halftone state for the printing device, using the processor. The calibration process in item 152 uses a test sheet printed by the print engine and scanned by a scanner of the printing device. This single calibration allows these methods to (in item 154) calculate a primary color profile (e.g., nominal profile) for the first halftone state, as well as secondary color profiles (e.g., non-nominal profiles) for the secondary halftone states available with the printing device based on the previously calculated relationship between the first halftone state and the secondary halftone states using a processor of the printing device.

The primary and secondary color profiles calculated in item 154 control how the printing engine prints colors of the print job. Color profiles are data that take into account the particular printer, the color settings, and the type of media, e.g., paper, used. For example, color profiles can be International Color Consortium (ICC) color profiles. An ICC profile is a set of data that characterizes a color output device, according to standards published by the ICC. The color output varies with different media types and halftones. Color management is a process of changing the digital values of primary colors to correspond with the values of a device's primary colorants. The ICC profile color management system provides a context for the conversion of primary numbers.

The transfer function or tone reproduction curve (TRC) is a common lookup table method for mapping contone value to other contone values more closely matching halftone density values. A TRC is usually a one-dimensional replacement lookup table. The LUT is a key-value replacement procedure where the current contone value is the key and the output device's halftone density is the value. While called a "curve" the values in the lookup table can be any value within a range. Several contone values may be mapped to the same halftone value. Thus, systems can use a TRC to map the source bit value to a more accurate halftone level.

Subsequently, these methods receive (into the printing device) a print job to be printed using the printing device in item 156, and such methods identify the secondary halftone state of the print job (using the processor) in item 158. With this, the methods can identify a secondary color profile from the secondary color profiles that corresponds to the secondary halftone state in item 160, and raster image process the print job using the secondary color profile to produce rasterized output (using the processor) in item 162. Then, these methods print the rasterized output on print media using a print engine of the printing device in item 164.

In order to implement a recalibration procedure, a calibration target is developed. The calibration target may contain a number of color patches, spread across the color space of the output printer. Printing the calibration target with a device provides an indication of the state of the device and/or any associated drift therein. In the calibration target step, wedges may be included in the CMYK colorants, both solid primary and secondary (pairs of CMYK) colors, and such can have a large number of nearly neutral patches around the a*=b*=0 axis. The calibration target design may also include a design of the layout of the patches that has extra marks or patches to help identify the orientation of the calibration target and thus, provided information as to the identity of particular patches. Further considerations may include randomization of the patches such that there is no particular dependence of one of the output colorants in either the horizontal or vertical direction. After the patches are defined in terms of their color and layout, the target design is implemented in some page description language (PDL) or other format that can be stored as part of the permanent memory of the image processing module. This enables the image processing module to print the target during the customer operation of the calibration process. As another step during the design of the calibration target, the desired values for each patch in a device independent color space is determined, either by measurement or by some combination of measurement and modeling. Any device independent color space may be implemented. For example, HSV, CIE XYZ, and CIE L*a*b* systems can be used as the device independent color space. For ease of reference, CIE L*a*b* system gives adequate results, and thus, the systems and methods herein are described using this space. These desired L*a*b* values are then stored as desired aim values representing the calibration target along with the instructions for printing the calibration target.

A calibration target should contain a plurality of color patches representative of a range of colors. In some instances, the color patches include patches that are neutral or near neutral in color. The color patches may take the form of single step wedges. The calibration target is scanned using a scanner representative of a scanning device to be manufactured. Either a carefully controlled model of the scanner may be used, or alternatively, several samples may be used and the results averaged. Similarly, the calibration target may be scanned with multiple "representative" scanning devices and the results obtained therefrom may be averaged. The output of this scan is a set of RGB values (e.g., contone data) for each patch in the calibration target. This set of RGB values is stored as target RGB values for the representative scanning device. In addition to the scanning values, a separate set of measurements is made, using a colorimeter to obtain L*a*b* values for each patch in the calibration target. These two data sets, the RGB values, and the L*a*b* values are then combined to generate a scanner profile, which can be used to convert RGB values to L*a*b*. The details of the scanner profile will depend on the particular method chosen to perform the conversion, ICC profile, 3D LUT or some other method. However, the generation of a scanner profile is well known to those skilled in the art.

To execute a recalibration process, the customer requests that the calibration target be printed using the graphic user interface of the printer. The customer then takes the output sheet or sheets, places them in the input to the scanner. Each patch in the image produced by the scanning is analyzed, taking an average over all or a portion of each patch to get an average RGB value for each patch in the target. During the analysis, the orientation of the page in the scanner can be set to allow the user to place the page or pages in the scanner in any orientation without compromising the quality of the recalibration. As each patch's RGB values are determined, a L*a*b* value for each patch is derived using a LUT, ICC profile conversion or other transform method implemented during the design of the color reproduction device.

The conversion of image data from the scanner space into the device independent space can be done using several different algorithms. For example, one can implement a transformation using the International Color Consortium (ICC) profile method. Alternatively, one may use well-known algorithms to develop a multidimensional look up table (LUT) that accepts the RGB values as input and has the corresponding device independent values as table entries.

By comparing the L*a*b* values with the aim values, a set of corrections are derived that can compensate for any shifts in the color reproduction properties of the output printer. These corrections are then used to generate a TRC function. Folding the generated TRC function into the baseline linear response halftone then creates a calibrated linear response halftone. The calibrated linear response halftone is then used to render image data for output in image processing module.

Thus, a scanned RGB image data (e.g., contone data) is obtained from scanning a copy of the calibration target generated by the printer. In response to a scanner profile, L*a*b* values for each patch in the target are generated. These L*a*b* values for each patch in the target are compared to the desired aim values to generate printer corrections. The specific printer corrections are generated based on a stored baseline linear response halftone.

Thus, L*a*b* values for each patch in the target are compared with the aim values to generate printer corrections. The printer corrections may include a set of color shift correction signals that correspond to the differences between the L*a*b* values for each patch in the target and aim values. The set of color shift correction signals can compensate for any shifts in the color reproduction properties of the output printer unit by comparing the device independent color signals representative of a printed version of the calibration target with the desired aim values.

The set of color shift correction signals may be implemented by TRC function. The TRC function(s) correct for a nonlinear response of the printer unit (e.g., nonlinear response due to equipment wear, ink supply changes, etc.) reflected in the set of color shift correction signals. The TRC function(s) are used to calibrate the baseline linear response halftone to determine a calibrated linear response halftone. The calibrated linear response halftone is then used for output on output printer. The calibrated linear response halftone is used until the reprographic system is calibrated again and a new calibrated linear response halftone is determined.

Figure 4:
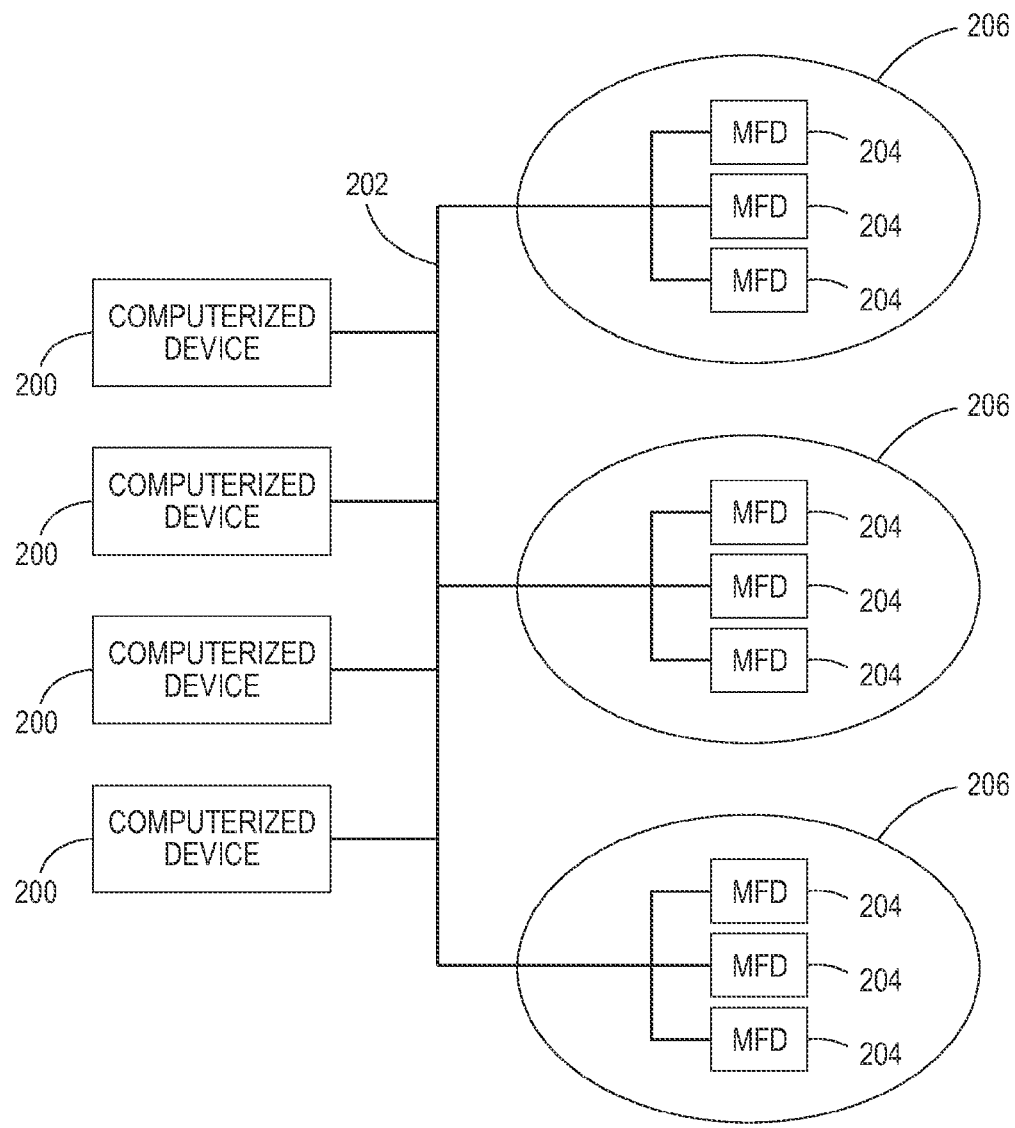
FIG. 4 is a schematic diagram illustrating systems herein.

As shown in FIG. 4, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 5:
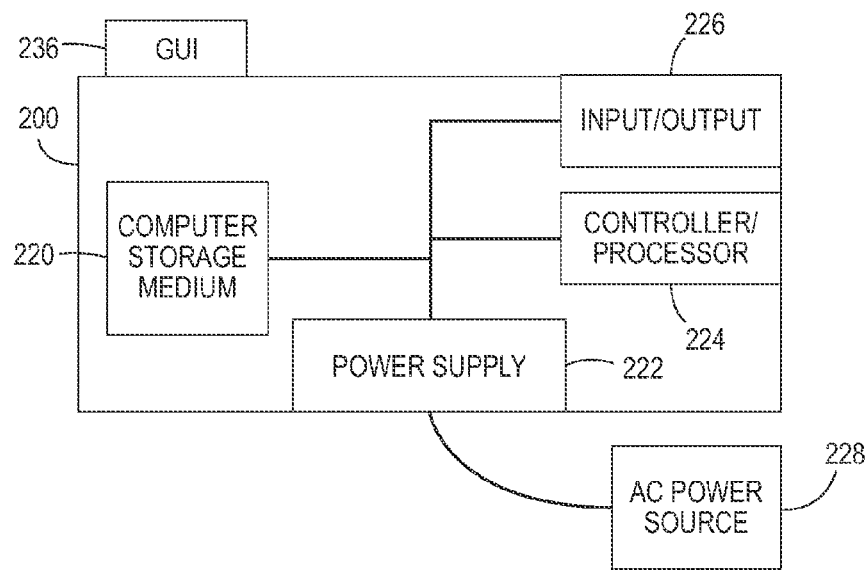
FIG. 5 is a schematic diagram illustrating devices herein.

FIG. 5 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Figure 6:
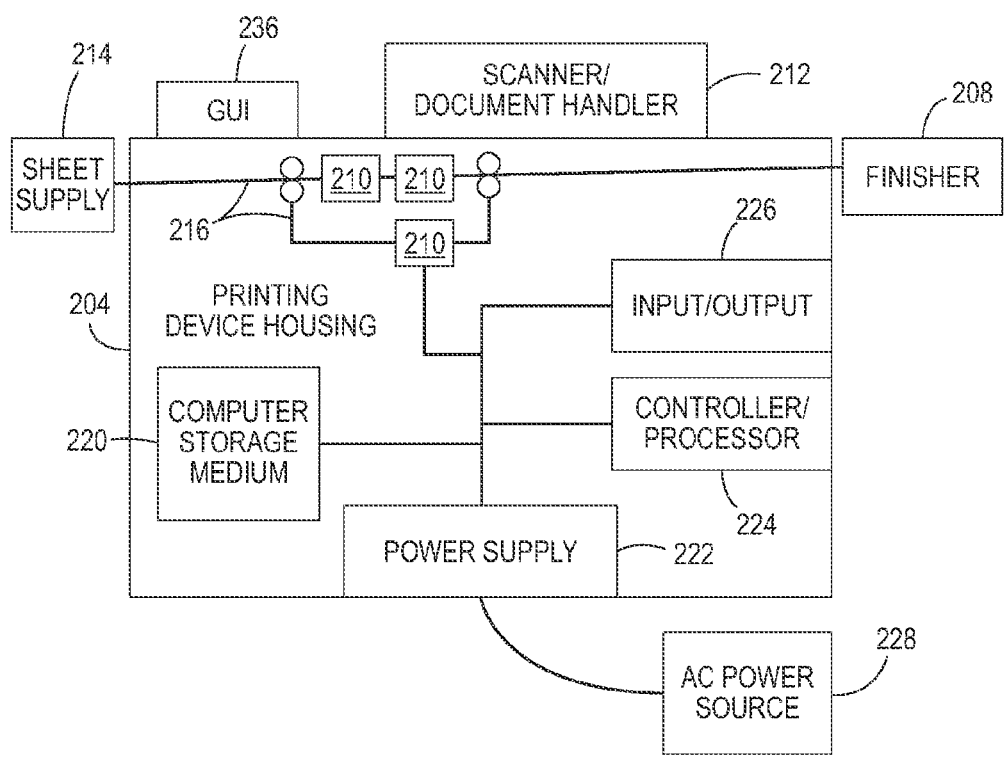
FIG. 6 is a schematic diagram illustrating devices herein.

FIG. 6 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, printing devices herein include, among other components, a processor 224, an input/output interface 226, a printing engine 210, a scanner 212, etc. The processor 224 calculates a relationship between a first halftone state and secondary halftone states based on printing capabilities of a printing device. The processor 224 also calibrates the printing device using the printing engine 210 and scanner 212 to develop a single calibration tone reproduction curve associated with the first halftone state for the printing device. The processor 224 then calculates a primary color profile for the first halftone state and secondary color profiles for the secondary halftone states available with the printing device based on the calculated relationship between the first halftone state and the secondary halftone states.

Subsequently, the interface 226 receives a print job to be printed using the printing device and the processor 224 identifies a secondary halftone state of the print job. The processor 224 also identifies a secondary color profile from the secondary color profiles that corresponds to the secondary halftone state. The processor 224 then raster image processes the print job using the secondary color profile to produce rasterized output, which is then printed on print media using the printing engine 210.

As would be understood by those ordinarily skilled in the art, the printing device shown in FIG. 6 is only one example and the systems and methods herein are equally applicable to other types of printing devices that may include fewer components or more components. For example, while a limited number of printing engines and paper paths are illustrated in FIG. 6, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A raster image tangible processor (RIP) is a component used in a printing system that produces a raster image also known as a bitmap. The bitmap is then sent to a printing device for output. Raster image processing is the process that turns vector digital information into a high-resolution raster image.

Halftoning can be performed to render continuous tone (contone) digital grayscale and color images into patterns of pixels that can be displayed on bi-level devices such as printers. The rendered images are commonly referred to as halftone images. The pixels of a halftone image are arranged in patterns such that the halftone image is perceived as having continuous tones when viewed through the human visual system (HVS).

One method of halftoning involves the use of dither matrices, also known as halftone screens. A halftone screen includes a two-dimensional array of thresholds. Each threshold is a number having a value v ranging from one to M−1, where M represents the total number of gray levels within the gray scale range being used. If the gray scale range has 256 gray levels, the value v is between one and 255.

For standard color dithering, one monochrome screen is used per color separation. In CMYK color space, for instance, a first screen is used for cyan (C), a second screen for magenta (M), a third screen for yellow (Y), and a fourth screen for black (K). Each monochrome screen is applied to a color separation independently of the other screens.

During halftone dithering of a color plane, pixel values in the contone image are compared to thresholds in the halftone screen. If the pixel value in the contone gray scale image pixel has a value larger than or equal to the corresponding threshold, a dot is formed in the corresponding position of the halftone image (assuming an ascending gray level numbering convention is employed, i.e., where higher gray level numbers correspond to darker gray levels). Decisions to place dots are made on a pixel-by-pixel basis.

Further, the terms automated or automatically mean that once a process is started (by a machine or a user), one or more machines perform the process without further input from any user. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   calibrating a printing device to develop a single calibration tone reproduction curve associated with a first halftone state for said printing device, using a processor of said printing device;
   calculating a primary color profile for said first halftone state and secondary color profiles for secondary halftone states available with said printing device based on a calculated relationship between said first halftone state and said secondary halftone states using said processor, said secondary halftone states being different from said first halftone state;
   receiving, into said printing device, a print job to be printed using said printing device;
   identifying a secondary halftone state of said print job;
   identifying a secondary color profile from said secondary color profiles that correspond to said secondary halftone state using said processor;
   raster image processing said print job using said secondary color profile to produce rasterized output using said processor; and
   printing said rasterized output on print media using a print engine of said printing device.

2. The method according to claim 1, said primary color profile and said secondary color profiles controlling how said printing engine prints colors of said print job.

3. The method according to claim 1, said relationship between said first halftone state and said secondary halftone states comprising a relationship based on ideal printing characteristics for said printing device.

4. The method according to claim 1, said calibrating processing using a test sheet printed by said print engine and scanned by a scanner of said printing device.

5. The method according to claim 1, said tone reproduction curve comprising a look up table (LUT).

6. A method comprising:
   calculating a calculated relationship between a first halftone state and secondary halftone states based on printing capabilities of a printing device using a processor of said printing device;
   calibrating said printing device to develop a single calibration tone reproduction curve associated with said first halftone state for said printing device, using said processor;
   calculating a primary color profile for said first halftone state and secondary color profiles for said secondary halftone states available with said printing device based on said calculated relationship between said first halftone state and said secondary halftone states using said processor, said secondary halftone states being different from said first halftone state;
   receiving, into said printing device, a print job to be printed using said printing device;
   identifying a secondary halftone state of said print job;
   identifying a secondary color profile from said secondary color profiles that correspond to said secondary halftone state using said processor;
   raster image processing said print job using said secondary color profile to produce rasterized output using said processor; and
   printing said rasterized output on print media using a print engine of said printing device.

7. The method according to claim 6, said primary color profile and said secondary color profiles controlling how said printing engine prints colors of said print job.

8. The method according to claim 6, said relationship between said first halftone state and said secondary halftone states comprising a relationship based on ideal printing characteristics for said printing device.

9. The method according to claim 6, said calibrating processing using a test sheet printed by said print engine and scanned by a scanner of said printing device.

10. The method according to claim 6, said tone reproduction curve comprising a look up table (LUT).

11. A printing device comprising:
    a processor calibrating a printing device to develop a single calibration tone reproduction curve associated with a first halftone state for said printing device, said processor calculating a primary color profile for said first halftone state and secondary color profiles for secondary halftone states available with said printing device based on a calculated relationship between said first halftone state and said secondary halftone states, and said secondary halftone states being different from said first halftone state;
    an interface operatively connected to said processor, said interface receiving a print job to be printed using said printing device, said processor identifying a secondary halftone state of said print job, said processor identifying a secondary color profile from said secondary color profiles that corresponds to said secondary halftone state, said processor raster image processing said print job using said secondary color profile to produce rasterized output; and
    a printing engine operatively connected to said processor, said printing engine printing said rasterized output on print media.

12. The printing device according to claim 11, said primary color profile and said secondary color profiles controlling how said printing engine prints colors of said print job.

13. The printing device according to claim 11, said relationship between said first halftone state and said secondary halftone states comprising a relationship based on ideal printing characteristics for said printing device.

14. The printing device according to claim 11, further comprising a scanner operatively connected to said processor, said calibrating processing using a test sheet printed by said print engine and scanned by said scanner.

15. The printing device according to claim 11, said tone reproduction curve comprising a look up table (LUT).

16. A printing device comprising:
a processor calculating a calculated relationship between a first halftone state and secondary halftone states based on printing capabilities of a printing device, said processor calibrating said printing device to develop a single calibration tone reproduction curve associated with said first halftone state for said printing device, said processor calculating a primary color profile for said first halftone state and secondary color profiles for said secondary halftone states available with said printing device based on said calculated relationship between said first halftone state and said secondary halftone states, and said secondary halftone states being different from said first halftone state;
an interface operatively connected to said processor, said interface receiving a print job to be printed using said printing device, said processor identifying a secondary halftone state of said print job, said processor identifying a secondary color profile from said secondary color profiles that corresponds to said secondary halftone state, said processor raster image processing said print job using said secondary color profile to produce rasterized output; and
a printing engine operatively connected to said processor, said printing engine printing said rasterized output on print media.

17. The printing device according to claim 16, said primary color profile and said secondary color profiles controlling how said printing engine prints colors of said print job.

18. The printing device according to claim 16, said relationship between said first halftone state and said secondary halftone states comprising a relationship based on ideal printing characteristics for said printing device.

19. The printing device according to claim 16, further comprising a scanner operatively connected to said processor, said calibrating processing using a test sheet printed by said print engine and scanned by said scanner.

20. The printing device according to claim 16, said tone reproduction curve comprising a look up table (LUT).

* * * * *